(12) United States Patent
Peterkin et al.

(10) Patent No.: US 12,083,631 B2
(45) Date of Patent: Sep. 10, 2024

(54) WELDED ASSEMBLY AND METHOD OF WELDING USING ELECTRO-SPARK DISCHARGE

(71) Applicant: Huys Industries Limited, Weston (CA)

(72) Inventors: Stephen Peterkin, Richmond Hill (CA); Nigel Scotchmer, Willowdale (CA); Dominic Cheuk Hung Leung, Thornhill (CA)

(73) Assignee: Huys Industries Limited, Etobicoke (CA)

( * ) Notice: Subject to any disclaimer, the term of this patent is extended or adjusted under 35 U.S.C. 154(b) by 307 days.

(21) Appl. No.: 17/230,644

(22) Filed: Apr. 14, 2021

(65) Prior Publication Data

US 2021/0316382 A1   Oct. 14, 2021

Related U.S. Application Data

(60) Provisional application No. 63/010,017, filed on Apr. 14, 2020.

(51) Int. Cl.
*B23K 9/00* (2006.01)
*B23K 9/025* (2006.01)
(Continued)

(52) U.S. Cl.
CPC ............ *B23K 9/0026* (2013.01); *B23K 9/025* (2013.01); *B23K 9/042* (2013.01); *B23K 9/095* (2013.01);
(Continued)

(58) Field of Classification Search
CPC ...... B23K 9/0026; B23K 9/025; B23K 9/042; B23K 9/095; B23K 9/235; B23K 20/12;
(Continued)

(56) References Cited

U.S. PATENT DOCUMENTS 2,526,035 A   10/1950   Miller
3,650,454 A    3/1972   Coucoulas
(Continued)

FOREIGN PATENT DOCUMENTS

CA   902189        6/1972
CA   1177545 A    11/1984
(Continued)

OTHER PUBLICATIONS

International Search Report and Written Opinion dated Jun. 10, 2014 PCT/CA2014/000219.
(Continued)

*Primary Examiner* — Jimmy Chou
(74) *Attorney, Agent, or Firm* — Smart & Biggar LP (57) ABSTRACT

A welded assembly includes a first object, a second object, and an interlayer. The interlayer is an ESD coating deposited on the first object, and the second object is welded to the coating. The second object may be a material that has thermally sensitive properties, such as a shape-memory material. The second weld may also be made by ESD. The interlayer may be made of more than one layer. The layer or layers may be deposited of a material chosen for its compatibility with one, the other, or both of the material of the first object and the material of the second object.

20 Claims, 6 Drawing Sheets

(51) Int. Cl.
  *B23K 9/04*      (2006.01)
  *B23K 9/095*     (2006.01)
  *B23K 9/235*     (2006.01)
  *B23K 20/12*     (2006.01)
  *B23K 103/20*    (2006.01)

(52) U.S. Cl.
  CPC .............. *B23K 9/235* (2013.01); *B23K 20/12* (2013.01); *B23K 2103/20* (2018.08)

(58) Field of Classification Search
  CPC .... B23K 2103/20; B23K 9/232; B23K 10/02; B23K 11/002; B23K 11/087; B23K 11/20; B23K 26/242; B23K 26/26; B23K 26/323; B23K 2101/35; B23K 2103/05; B23K 2103/18; B23K 2103/26
  See application file for complete search history.

(56) References Cited

U.S. PATENT DOCUMENTS

| | | | |
|---|---|---|---|
| 3,662,148 A | 5/1972 | Blosser | |
| 3,763,343 A | 10/1973 | Bertrand | |
| 3,764,771 A | 10/1973 | Roy | |
| 3,845,271 A | 10/1974 | Hirano | |
| 3,939,321 A | 2/1976 | Rocklin | |
| 4,029,931 A | 6/1977 | Simmons | |
| 4,098,447 A | 7/1978 | Edson | |
| 4,356,378 A | 10/1982 | Cloos | |
| 4,405,851 A * | 9/1983 | Sheldon | B23K 11/0013 219/76.13 |
| 4,556,775 A | 12/1985 | Inoue | |
| 4,614,857 A | 9/1986 | Webb | |
| 4,861,961 A | 8/1989 | Huys | |
| 4,866,237 A | 9/1989 | Inoue | |
| 4,873,412 A | 10/1989 | Vinczer | |
| 4,992,639 A | 2/1991 | Watkins | |
| 5,281,789 A | 1/1994 | Merz | |
| 5,448,035 A | 9/1995 | Thutt | |
| 5,541,382 A | 7/1996 | Taylor | |
| 5,688,364 A | 11/1997 | Sato | |
| 5,914,057 A | 6/1999 | Nippert | |
| 5,947,364 A | 9/1999 | Tamura | |
| 6,020,568 A | 2/2000 | Joseph | |
| 6,295,708 B1 | 10/2001 | Spaid | |
| 6,380,505 B1 | 4/2002 | Stoops | |
| 6,417,477 B1 | 7/2002 | Brown | |
| 6,452,130 B1 | 9/2002 | Qian et al. | |
| 7,358,458 B2 | 4/2008 | Daniel | |
| 7,538,294 B2 | 5/2009 | Scotchmer | |
| 8,101,040 B2 | 1/2012 | Shibata | |
| 11,077,516 B2 | 8/2021 | Scotchmer | |
| 2003/0000926 A1* | 1/2003 | Senor | G21C 21/00 219/76.13 |
| 2005/0072762 A1 | 4/2005 | Delgado | |
| 2005/0092728 A1 | 5/2005 | Barbeau et al. | |
| 2005/0284848 A1 | 12/2005 | Martin | |
| 2006/0029512 A1 | 2/2006 | Dong et al. | |
| 2006/0137777 A1 | 6/2006 | Ishikawa | |
| 2009/0161212 A1 | 6/2009 | Gough | |
| 2009/0314748 A1 | 12/2009 | Rao | |
| 2010/0124669 A1* | 5/2010 | Lee | B23K 20/227 228/226 |
| 2010/0152870 A1* | 6/2010 | Wanner | G01B 21/042 901/3 |
| 2011/0042356 A1 | 2/2011 | Leung et al. | |
| 2012/0152909 A1 | 6/2012 | Hung | |
| 2012/0248070 A1* | 10/2012 | Chen | C23C 26/02 219/76.13 |
| 2013/0260648 A1 | 10/2013 | Rementer | |
| 2013/0333180 A1* | 12/2013 | Zanon | B23P 6/00 29/402.18 |
| 2014/0197148 A1* | 7/2014 | Chen | B23K 35/286 428/650 |
| 2015/0076120 A1 | 3/2015 | Pagano | |
| 2016/0031033 A1* | 2/2016 | Lin | B23K 9/04 219/76.13 |
| 2016/0114428 A1* | 4/2016 | Wang | B23K 26/32 219/121.64 |
| 2016/0167180 A1* | 6/2016 | Thayer | B22F 1/17 219/76.13 |
| 2017/0297136 A1* | 10/2017 | Brown | C22C 38/04 |
| 2021/0138569 A1* | 5/2021 | Marchione | B23K 9/044 |

FOREIGN PATENT DOCUMENTS

| | | | |
|---|---|---|---|
| CA | 2061635 | 3/1997 | |
| CA | 2712119 A1 | 2/2011 | |
| CN | 101994079 A | 3/2011 | |
| CN | 102019531 A | 4/2011 | |
| CN | 201824106 | 5/2011 | |
| CN | 102618865 A * | 8/2012 | .............. B23K 9/04 |
| CN | 103131981 A | 6/2013 | |
| CN | 103993312 A | 8/2014 | |
| DE | 102015000734 | 7/2016 | |
| EP | 0192880 B1 | 1/1989 | |
| EP | 2664404 A2 | 11/2013 | |
| EP | 2684981 A2 * | 1/2014 | .............. B23P 6/002 |
| GB | 428396 A | 5/1935 | |
| GB | 2215250 A | 9/1989 | |
| GB | 2223919 | 10/1992 | |
| WO | 9511107 | 4/1995 | |
| WO | 2006/122410 A1 | 11/2006 | |
| WO | 2014138891 A1 | 9/2014 | |

OTHER PUBLICATIONS

International Search Report and Written Opinion in PCT/CA 2021/050501 dated Jun. 17, 2021.

International Search Report and Written Opinion in PCT/CA 2021/050625 dated Aug. 12, 2021.

Chen et al., Surface modification of resistance welding electrodes by electro—spark deposited composite coatings Part II, Metallurgical behavior during welding, www .elsevier.com, Science Direct, Sur face & Coatings Technology 201 ( 2006 ), pp. 2419-2430.

Chen et al., Surface modification of resistance welding electrode by electro—spark deposited composite coatings : Part I, Coating characterization, www.elsevier.com, ScienceDirect, Surface & Coatings Technology 201 ( 2006 ), pp. 1503-1510.

Zou et al., "Surface modified long—life electrode for resistance spot welding of Zn—coated steel", www . elsevier .com , Science Direct, Journal of Materials Processing Technology 209 ( 2009 ), pp. 4141 4146.

Kumar, "Ultrasonic assisted friction stir processing of 6063 aluminum alloy", www . elsevier . com , ScienceDirect, Archives of Civil and Mechanical Engineering 16 ( 2016 ), pp. 473-484.

Avettand—Fenoel et al., "A review about Friction Stir Welding of metal matrix composites", www . elsevier . com, ScienceDirect, Materials Characterization 120 ( 2016 ), pp. 1-17.

Lu, "Improvement of copper plating adhesion on silane modified PET film by ultrasonic—assisted electroless deposition", www . elsevier . com , ScienceDirect, Applied Surface Science 256 ( 2010 ), pp. 3554-3558.

Liu, "Elimination of tunnel defect in ultrasonic vibration enhanced friction stir welding", www . elsevier . com , ScienceDirect, Materials and Design 90 ( 2016 ), pp. 350-358.

Wang et al., "Si particulate—reinforced Zn—Al based composites joints of hypereutectic Al—50Si alloys by ultrasonic—assisted soldering", www . elsevier . com , ScienceDirect, Materials and Design 107 (2016 ), pp. 41-46.

Niksefat et al., "Mechanical and electromechanical properties of ultrasonic—assisted electrodes deposition of Ni—B—TiO2 composite coatings", www . elsevier . com , ScienceDirect, Journal of Alloys and Compounds 633 ( 2015 ), pp. 127-136.

Zhao et al., "Microstructure evolution and mechanical properties of ultrasonic—assisted soldering joints of 2024 aluminum alloys", www . elsevier . com , ScienceDirect, Trans Nonferrous Met . Soc . China 21 ( 2011 ), pp. 1937-1943.

(56) References Cited

OTHER PUBLICATIONS

Rostamiyan et al., "Experimental studies on ultrasonically assisted friction stir spot welding of AA6061", www.elsevier.com, ScienceDirect, Archives of Civil and Mechanical Engineering 15 (2015), pp. 335-346.
Chen et al., Surface Modification of Resistance Welding Electrodes by Electro—Spark Deposited Coatings, Department of Mechanical Engineering; University of Waterloo; Waterloo, ON, Canada; Coatings 2005; Materials Science & Technology 2005, pp. 59-62.
Total Patent, machine translation of Chinese Patent Publication No. CN102019531.
Total Patent, machine translation of Chinese Patent Publication No. CN103993312.

* cited by examiner

WELDED ASSEMBLY AND METHOD OF WELDING USING ELECTRO-SPARK DISCHARGE

This application claims the benefit of the priority of U.S. Provisional Patent Application Ser. No. 63/010,017 filed Apr. 14, 2020, the specification and drawings thereof being incorporated in their entirety herein by reference.

FIELD OF THE INVENTION

This specification relate to the field of welding using electro-spark discharge.

BACKGROUND

In some processes it may be desired to make a weld without significantly altering the grain structure of one or the other, or both, of the parts being joined together. It may be that the parts to be joined, when welded, may yield secondary or tertiary compounds from alloyed elements otherwise in solution in at least one of them. Those compounds may have undesirable properties; or may simply detract from the properties for which the joined elements were desired to be combined in the first place. It may involve undesired precipitation, or loss of age hardening, or loss of shape-memory abilities, or undesired alloys such as oxides. There may be other reasons. One approach to this problem may be to pre-coat one or other of the parts with an intermediate layer of a weld metal element or alloy, particularly where direct welding of the parts together may be difficult either for metallurgical or process limitation reasons. For example, one or other of the parts may be a sintered part, or may be a pert with a metallic ceramic. Such parts can be difficult to weld or to machine. In some instances, an alloy such as nickel may be friendly to both parts to be welded and so a layer, or layers, of such an alloy may be built up on one or the other of the parts. It may be termed an intermediate layer, or, more simply, an "interlayer". Further, where it is desired not to upset the pre-welded grain structure or heat treatment of one or another of the parts, it may be desirable to perform such preliminary steps, and possibly the weld itself, with a low energy input. To that end, the present inventor has considered the possibilities of using Electro-spark discharge (ESD) welding for one or more steps in such a process as discussed herein.

In each process, the manufactured part may be made of a material where either the geometry of the part or the nature of the material itself may make post-formation machining problematic. However, notwithstanding that a molding, sintering, or cumulative printing process may yield a part that is near-net-size, and that may have material properties that may be difficult to obtain in a machined part, a weld to another object may nonetheless be desired.

Electro-Spark Discharge is a process by which the surface of an object may be treated or coated with a deposited material. The work piece is electrically conductive. One terminal of an electrical discharge apparatus is connected to the work piece (or to a fixture in which the work piece is held), and a moving electrode holder is used to cause an electrode to approach the work piece, and for material from the electrode to be deposited on the work piece when an electrical arc passes between the electrode tip and the work piece. In this process the electrode is consumed, bit-by-bit. As the process recurs repeatedly, the surface of the work piece is progressively covered, or coated in the deposited material. The deposited material is fused to the work piece surface.

SUMMARY OF THE INVENTION

In an aspect of the invention there is a method of forming a welded connection between a first object and a second object, the first object and the second object is electrically conductive. The method includes coating a first region of the first object with an electro-spark discharge coating; placing the second object in contact with the coated region of the first object; and subsequently welding the second object to the electro-spark discharged coating of the first region of the first object.

In a feature of that aspect, the second object is welded to the electro-spark discharge (ESD) coated region by a method of welding other than ESD. In a further feature, the second object is welded to the electro-spark discharge coated region by electro-spark discharge welding. In another feature, the first region has a footprint that corresponds to a footprint of the second object. In still another feature, the first object is made of a different material from the second object. In yet another feature, the electro-spark discharge coating is made of the same material as the second object. In still another feature, the first object is made of a first material; the second object is made of a second material; the electro-spark discharge coating is made of a material that is different from the first material; and the electro-spark discharge coating is made of a material that is different from the second material.

In another feature the second material differs from the first material. In an additional feature, the second material is a shape memory alloy. In a further feature, the shape memory alloy is a NiTi alloy. In a further feature, the first object is a stainless steel alloy. In still another feature, the first object is made of a stainless steel alloy and the shape memory alloy is a NiTi alloy. In still another feature the subsequent welding is laser welding or arc welding. In a further feature, the subsequent welding is resistance welding. In a yet further feature, the method includes coating a second region of the second object with an electro-spark discharge coating layer, and the subsequent welding includes welding the first electro-spark discharge layer to the second electro-spark discharge layer.

In another feature, the method includes coating the first object with more than one pass of ESD material on the first object to build a coated region of a set thickness. In another feature, the method includes making at least a first layer and a second layer of electro-spark discharge deposited material on the first object, the first layer is made of a different composition of material than at least one subsequent layer. In another feature, the method includes alternately discharging electrical current through the first object and the second object to build a weld fillet of electro-spark discharge material between the first object and the second object. In another feature, it includes forming at least a second electro-spark discharge coated region on the first object and welding the second object to the first object at least at the first electro-spark discharge coated region and at the second electro-spark discharge coated region. In another feature, the method includes forming at least a second electro-spark discharge coated region on the first object, and subsequently welding a third object to the second electro-spark discharge coated region.

In another aspect there is a welded assembly that includes a first object; a second object; and an electro-spark discharge interlayer. The ESD interlayer is formed on the first object. There is a weld between the electro-spark discharge layer and the second object.

In a feature there is a HAZ in the second object adjacent to the weld between the electro-spark discharge layer and the second object. In another feature, the second object is welded to the electro-spark discharge coated region by electro-spark discharge welding and the weld is free of a heat affected zone. In another feature, the first region of the coating has a footprint that corresponds to a footprint of the second object. In yet another feature, the first object is made of a different material from the second object. In another feature, the electro-spark discharge coating is made of the same material as the second object. In still another feature, the first object is made of a first material; the second object is made of a second material; the interlayer ESD coating is made of a material that is different from the first material; and the ESD coating is made of a material that is different from the second material. In a still further feature, the second material is different from the first material. In an additional feature, the second material is a shape memory alloy. In a still yet further feature, the shape memory alloy is a NiTi alloy. In a further feature, the first object is a stainless steel alloy. In another feature, the first object is made of a stainless steel alloy and the shape-memory alloy is a NiTi alloy.

In another feature, the second object has a second region has a second ESD coating layer, and the subsequent welding includes welding the first ESD coating layer to the second ESD coating layer. In another feature, coating of the first object includes more than one pass of electro-spark discharge deposited material on the first object to build a coated region of a set thickness. In yet another feature, there is at least a first layer and a second layer of ESD material on the first object, the first layer is made of a different composition of material than at least one subsequent layer. In another feature, there is at least a second electro-spark discharge coated region on the first object and the weld between the second object and the first object is made between the first electro-spark discharge coated region and the second electro-spark discharge coated region. In another feature, there is a second electro-spark discharge coated region on the first object, and a third object is welded to the second electro-spark discharge coated region. In a further feature, both the first weld and the second weld are substantially free of heat affected zones. In another feature, the interlayer is subject to peening, and the peening includes impacting the first region with a mean impact density in the range of between 0 and 30,000 impacts per cm². In a finer gradation, the mean impact density is in the range of 3,000 and 20,000 impacts per cm². In another feature, the welding applicator has an initial discharge voltage in the range of 30 to 200 V.

In another feature, the substrate is a work piece formed of a material that includes at least one of (a) Nickel; (b) Chromium; (c) Molybdenum; (d) Titanium; (e) Tungsten; (f) Niobium; (g) Iron; (h) Aluminum; and (i) Copper; (j) Magnesium; and (k) Cobalt. In a further feature, the work piece, by weight is at least one of (a) 10% Nickel; (b) 5% Chromium. In another feature, the work piece, by weight is at least one of (a) 10% Cobalt; (b) 5% Chromium. In still another feature, the work piece, by weight is at least one of (a) 10% Titanium; (b) 2% Aluminum. In another feature, the work piece is made of a metal alloy of which Nickel and Chromium are the largest constituents by wt. %. In a further feature the work piece is made of a metal alloy of which Cobalt and Chromium are the largest constituents by wt. %. In another feature, the work piece is made of a metal alloy of which Titanium is the largest constituents by wt. %. In a still further feature, the work piece is made of a metal alloy of which Aluminum is the largest constituents by wt. %. In an additional feature, the work piece is formed of an alloy that, by weight, has a higher percentage of Nickel than any other constituent. In another feature, the interlayer is made of an ESD coating material formed of an alloy including at least one of (a) Nickel; (b) Chromium; (c) Iron; (d) Tungsten; (e) Cobalt; and (f) Titanium. In another feature, nickel is, by wt. %, the largest component of the alloy of the coating material. In another feature, iron is, by wt. %, the largest component of the alloy of the coating material. In another feature, cobalt is, by wt. %, the largest component of the alloy of the coating material. In still another feature, titanium is, by wt. %, the largest component of the alloy of the coating material. In yet another feature, the interlayer includes a second ESD coating applied on top of the first ESD coating. In yet another feature, the material deposited in the second ESD coating is different from the material deposited in the first ESD coating.

These and other features and aspects of may be understood with the aid of the detailed description and drawings that follow.

DETAILED DESCRIPTION

The description that follows, and the embodiments described therein, are provided by way of illustration of examples of particular embodiments of the principles of the present invention. These examples are provided for the purposes of explanation, and not of limitation, of those principles and of the invention. In the description, like parts are marked throughout the specification and the drawings with the same respective reference numerals. The drawings are substantially to scale, except where noted otherwise, such as in those instances in which proportions may have been exaggerated to depict certain features. In that regard, this description pertains to the deposition of a layer or multiple layers of a welded coating by electro-spark discharge. In general, these layers tend to be of the order of a few tens of µm thick, e.g., 20 µm to 200 µm, and may tend not to exceed 2 mm in thickness. Accordingly, the thicknesses shown in the layers and the fillets of the various illustrations may be greatly exaggerated for the purposes of conceptual understanding.

In this description may use multiple nouns to provide nomenclature for the features. The multiple nouns are used as synonyms, and the detailed description is used as a thesaurus to convey understanding at both the specific level and at the broader conceptual level. English often has many words for the same item, and where multiple terminology is provided, it shows that synonyms for the item are within the understanding of the feature, and that it is not limited to one particular noun.

Figure 1:
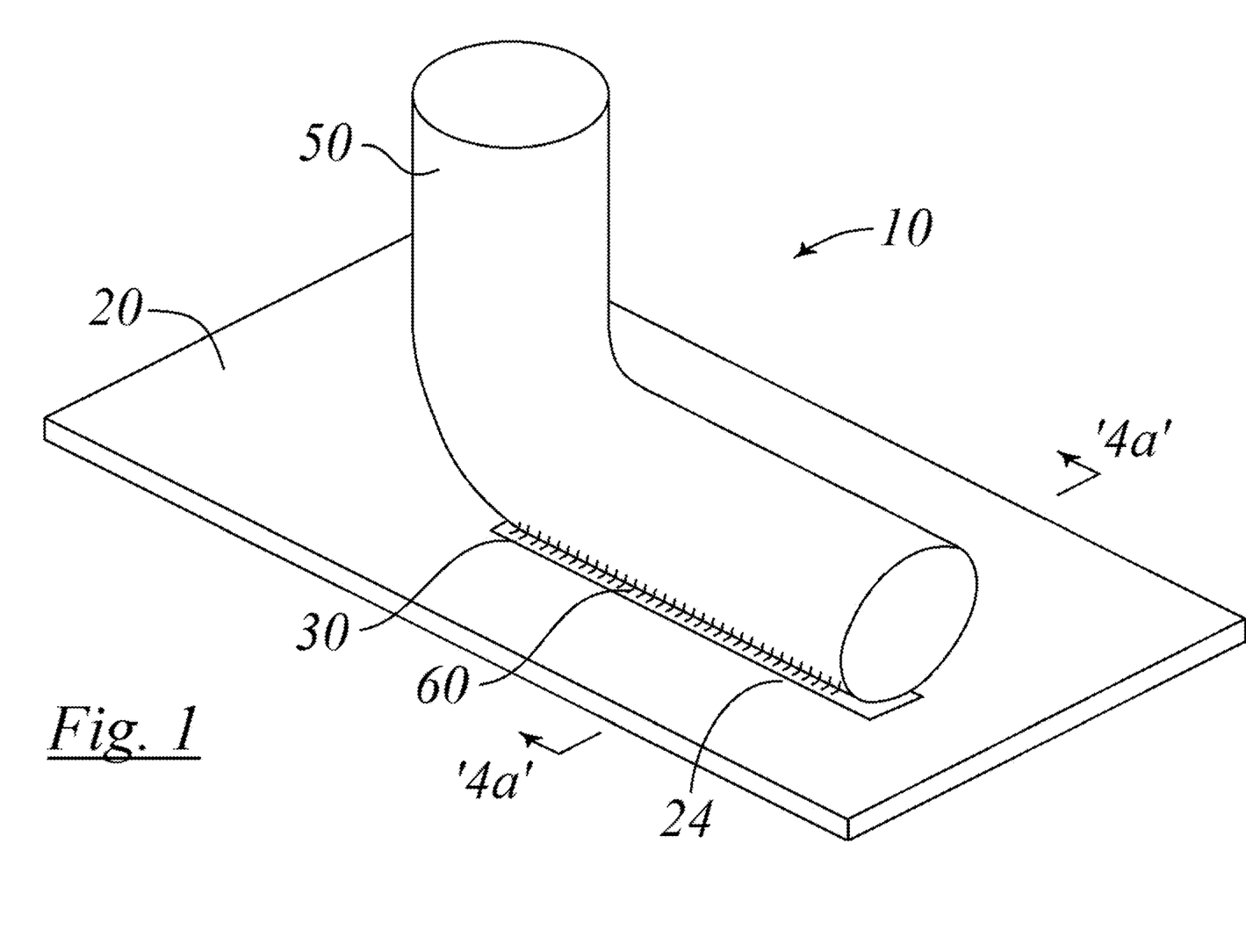
FIG. 1 is a simplified isometric view showing the relationship of a substrate, and interlayer, and an object to be welded to the substrate.

In terms of establishing process context, FIG. 1 shows a first member, or first object to be welded, identified as a substrate 20. This nomenclature of a "substrate" is intended to refer to any first object to be welded, whether it is flat or curved, thin or thick, whatever its profile may be, and whatever appearance it may have in plan form. In that context "substrate" is intended to be generic, unless indicated otherwise. There is a welded layer or covering, or stratum, or deposition, which is given the nomenclature coating 30. The nomenclature "coating is likewise intended to be generic. Coating 30 has been deposited on substrate 20 by an electro-spark discharge (ESD) process using an ESD welding applicator.

Figure 5:
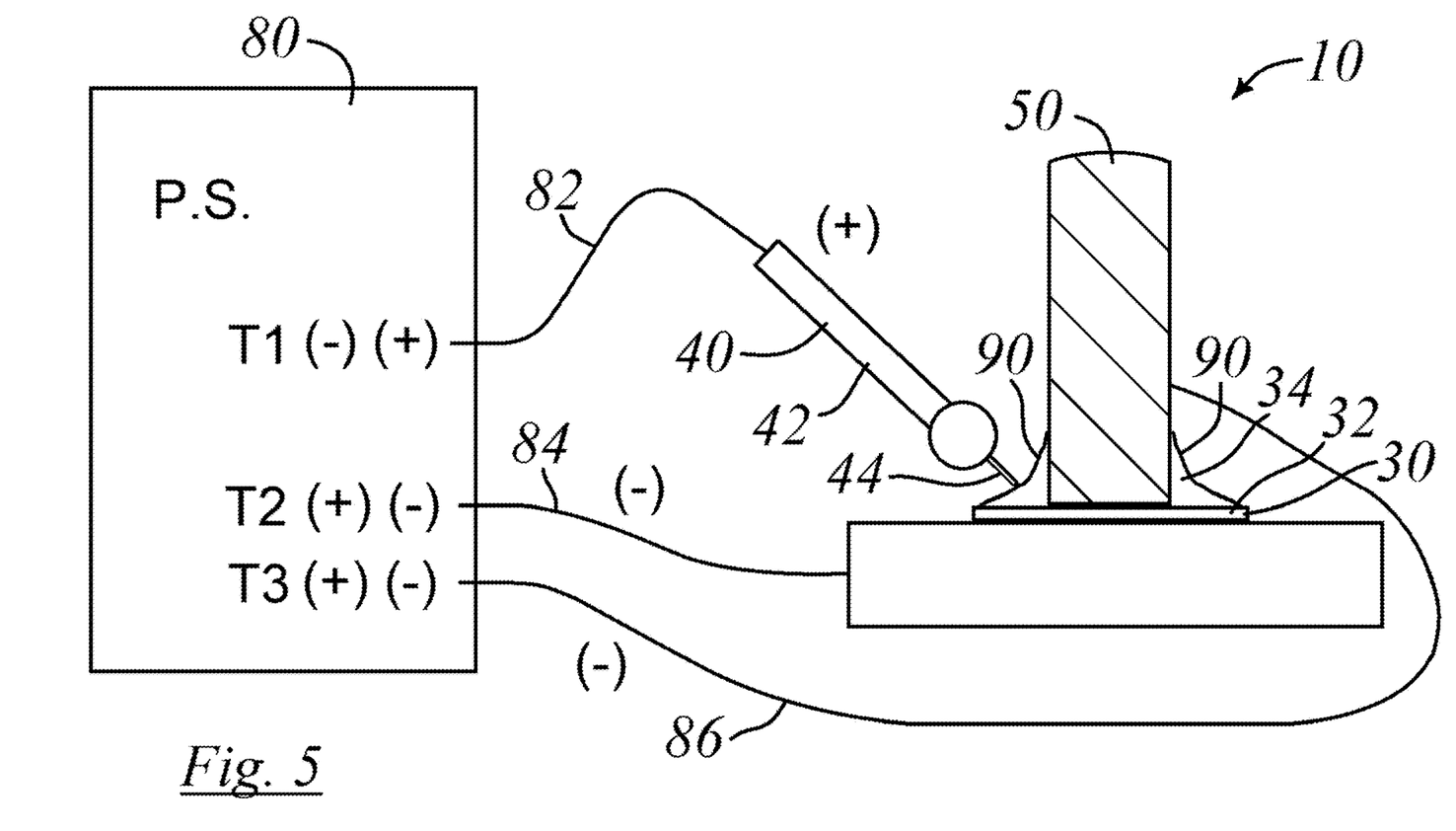
FIG. 5 shows an alternate embodiment in which a first interlayer is established on a first object to be welded, and filets of electro-spark deposited material are built up between the interlayer coating and the second object to be welded.

One kind of ESD welding applicator is indicated in FIG. 5 as an electrode 40. Electrode 40 includes a consumable welding rod that is held in a handle or fixture or applicator 42 of some kind. Whether hand-held or held by a robot, the term "electrode" is also intended to be generic. Where it is held by a robot, the robot may be programmed to lay down coating 30 according to a particular pattern or footprint on substrate 20. The welding rod 44 held by applicator 42 may be of constant diameter, and may in some instances be of relatively small diameter, such as a few millimeters, e.g., 1.5 mm, 1.8 mm, and so on. It may rotate about its own longitudinal axis in use. When welding rod 44 is consumed, it is replaced with a new consumable welding rod. The composition of welding rod 44 is chosen to suit the application. By the nature of the ESD deposition process, applicator 40 is subject to vibration, whether due to a mechanical oscillator such as a rotating or reciprocating imbalance weight, or due to an ultrasonic vibrator. The voltage of discharge, the frequency of discharge and the duration of discharge or the capacitance of the discharge, or all of them, are parameters that are subject to adjustment and selection according to the materials to be welded, and the thickness of coating to be applied. In the process of depositing coating 30, vibration may be applied to substrate 20, whether or not welding applicator 40 is in contact with it. Welding may occur with or without shielding gas. In the processes described herein, it may be taken that the ESD process occurs in the presence of a shielding gas, such as Argon.

There is a second member, identified as second object 50. It is brought into contact with coating 30 after coating 30 has been applied to substrate 20. Coating 30 then becomes, or makes, an intermediate layer, or "interlayer", between the first object, namely substrate 20 and the second object 50. A subsequent weld 90 is then formed between object 50 and coating 30. That is, there is a first weld made by an ESD deposition process between the material of coating 30 and substrate 20; and a second weld made between second object 50 and coating 30.

In considering these items, substrate 20 may be any kind of work-piece that is electrically conductive and upon which a welded ESD coating can be deposited. In particular, substrate 20 may be made of a material that may otherwise be difficult to weld, or that may be difficult to weld to the particular material of which second object 50 is made. This may occur even where the first and second materials are the same, but where a coating of the material, or alloying materials in solution in the material may make welding problematic for one reason or another; or where the weld would cause precipitation of element in the metal alloy that are perhaps better left dispersed in solution.

For example, a higher energy form of welding, such as resistance welding, with materials of significantly different melting points, one material will melt and form a liquid pool much more readily than another, with a larger HAZ, and more opportunities for items in both solutions to join and form undesired compounds (e.g., ceramic particles) at the weld interface. Or, it may facilitate the precipitation of alloying elements that had been in solution into larger coalesced particles, and to loss of alloy strength. By contrast, an ESD coating forms with very low energy input per discharge. The deposited metal of welding rod 44 fuses with the base metal of substrate 20 in a true welded bond, but not enough energy is used to cause alloys in solution to precipitate significantly, if at all, and the physical region affected by the weld is of the order of a few um thick. There is in essence no substantial liquid weld pool, and the time duration of the spark discharge to make the weld is small, typically of the order of a millisecond or less.

That is, coating 30 may be chosen of a material that welds relatively easily to the material of substrate 20, and that welds relatively easily to the material of second object 50. This may be expressed differently. When the "interlayer" is deposited on the first substrate, it can change the resistivity of the resultant surface layer of the substrate. A change in surface resistivity may then make it easier to weld the resultant alloy to the second member or substrate than would have been the case for the material of the first substrate prior to deposition of the interlayer. For example, substrate 20 may be made of a steel, such as a stainless steel, and the material of coating 30 may be of nickel or a nickel-based alloy. Second object 50 may be made of a material such as a shape-memory alloy.

In one example, it may be that the shape-memory alloy is a Nickel-Titanium, NiTi, alloy. Shape memory alloys exhibit properties of mechanical memory during phase changes due to heat or mechanical stress and possess pseudo elastic properties. A shape-memory alloy may be difficult to weld to a stainless steel alloy because of undesired combination of elements of the alloys, or where the heat input in welding is too high and causes the shape-memory properties to tend to be lost.

In that context, it may be desired that the weld of the interlayer to substrate 20 be a low energy weld, such as may tend to result in a weld that, while forming an atomic level bond, is nonetheless substantially free of a heat affected zone (HAZ), that may tend to leave the alloys of the materials (e.g., the shape-memory alloy) with the material properties desired in the first place. The use of a low-energy coating process such as ESD may tend to discourage the precipitation of alloy elements. To that end, an ESD process is used to provide coating 30 on substrate 20. That is, ESD is used as a process of depositing an interlayer as part of a method of joining Ni—Ti shape memory alloys to other structural components. This process or method is a low-energy process, i.e., with a low heat input that may tend to improve the joints of NiTi shape memory alloys to steel substrates. In one example the interlayers were of Al-4043, Commercially Pure Ti, and Inconel 625. The second weld was a laser weld of NiTi wires joined to ESD Interlayers on 304 stainless steel. This combination appeared to show an improvements in brittle behaviors, and a retention of the bulk pseudoelastic properties of the shape-memory items.

Figure 2:
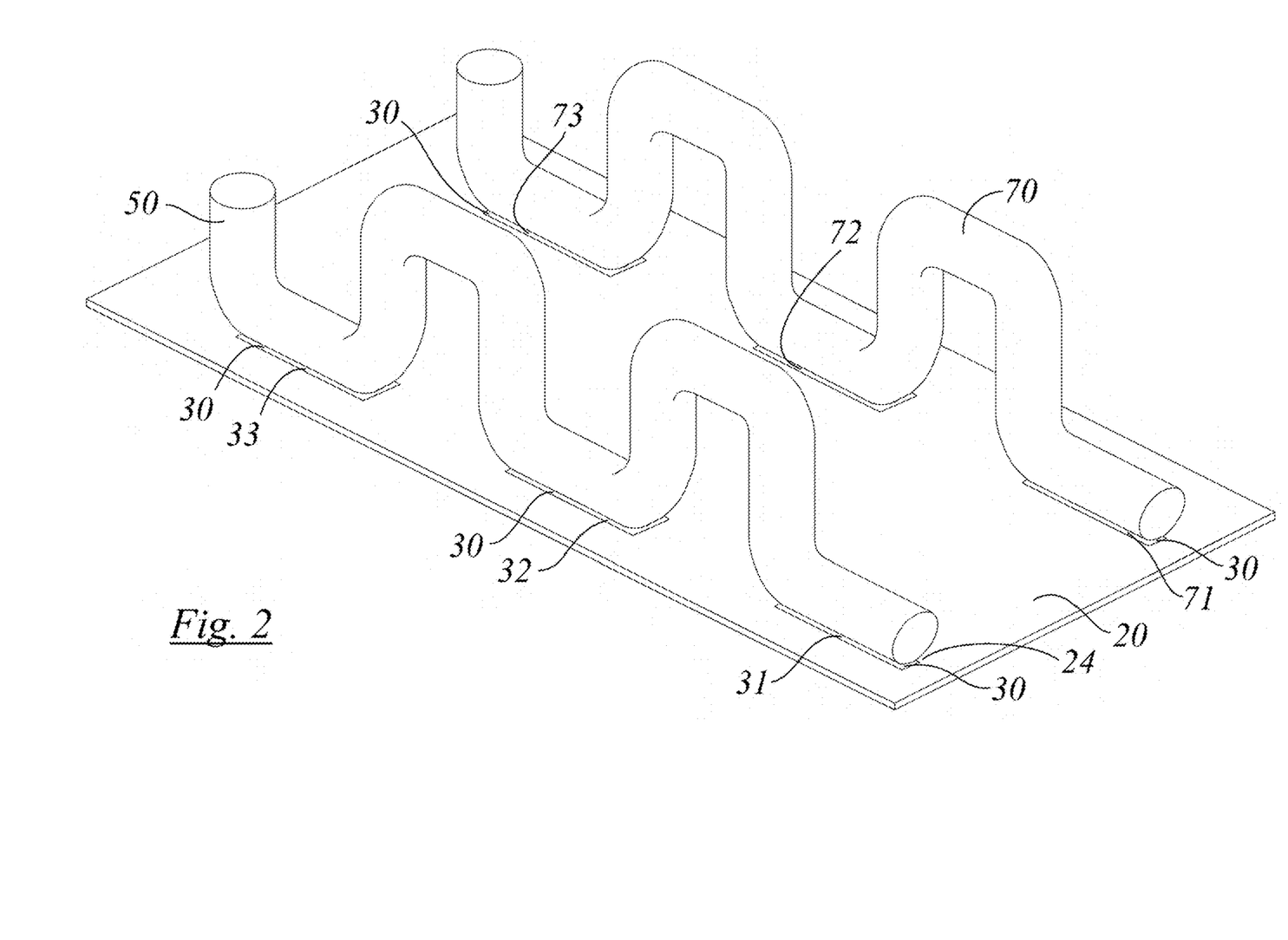
FIG. 2 is an isometric view of an alternate embodiment to that of FIG. 1 showing a substrate having two objects secured to it, the objects being secure at multiple locations.
Figure 3:
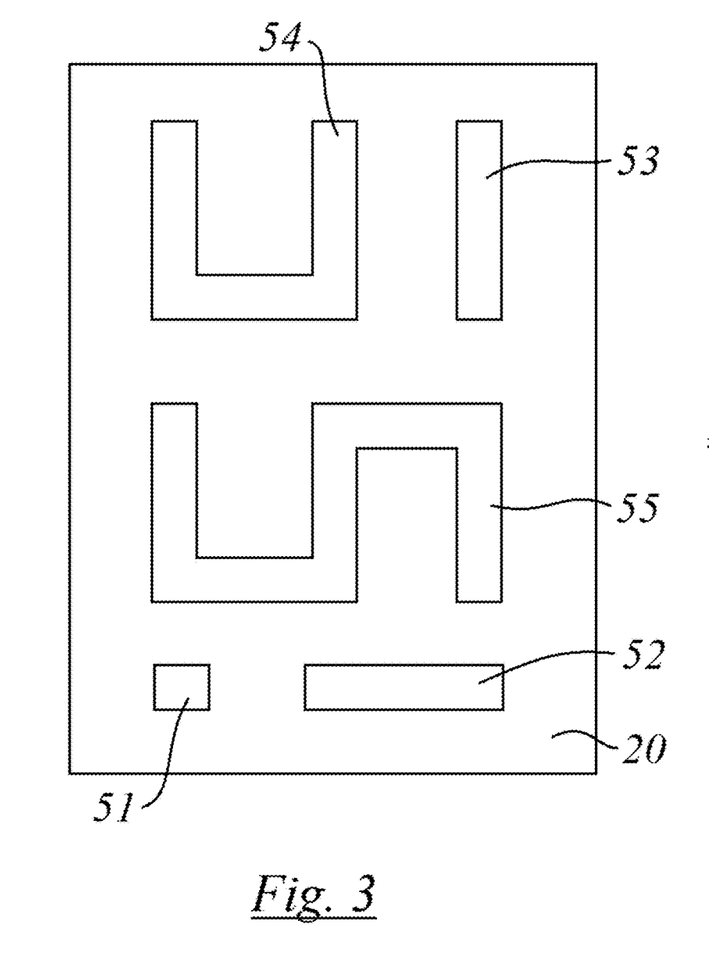
FIG. 3 is a plan view of the substrate of FIG. 1 with a set of interlayer coating footprints thereon.

Moreover, use of an ESD coating may also allow a coating 30 to have a specific footprint sized and configured to match the mating footprint or second object 50, as shown in FIG. 1. FIG. 2 and FIG. 3 show several different footprints 51, 52, 53, 54, 55, such as may correspond to contact regions of second object 50 and such other additional second, third, fourth, and so on, objects as may be welded to substrate 20. As indicated in FIG. 3, these footprints need not be purely rectangular, but may be have legs or portions that form extended shapes, such as the U-shape of footprint 54 or the S-shape of footprint 55. As shown in FIG. 2, this permits coating 30 to be discontinuous, which is to say there may be a sub-region or plural regions of coating 30 (or coatings 30), such as a first coated region 31 and a second coated region 32. There may be a third coated region 33, and such other coated regions as may be, that are separate and distinct from each other. These multiple regions may each provide an interlayer for a unique second object, or a single second (or third, or fourth, or as may be) object may be welded to two or more of them. For example, there may be one second object 50 that may be attached to corresponding different portions or regions 51, 52 (and possible more, such as 53) of substrate 20, or of corresponding portions or regions 71, 72, and 73 of substrate 20 for welding to corresponding regions or portions of a third member or object 70.

Figure 4A:
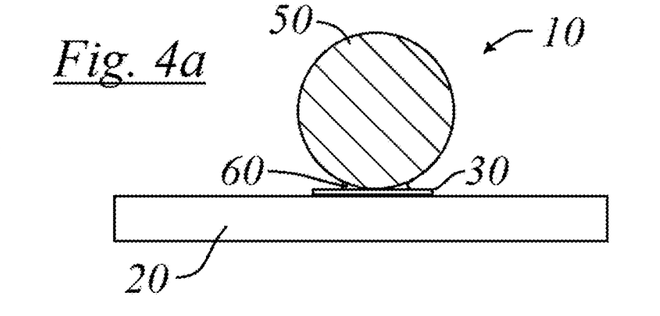
FIG. 4a is a cross-sectional view of an assembly such as that of FIG. 1 showing the weldment layers including an interlayer located between the first object to be welded and the second object to be welded.
Figure 4B:
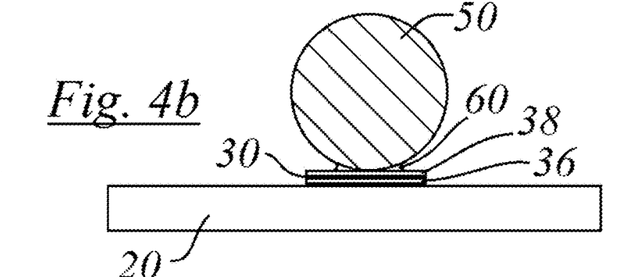
FIG. 4b is an alternate embodiment of assembly to that of FIG. 4a having two interlayers, one laid down upon another.

Furthermore, being an ESD coating, the thickness of coating 30 can be controlled by controlling the quantity of deposited materials. As indicated in FIG. 4b, coating 30 may include a first coating layer 36 that is made of a first material, or first alloy, and a second coating layer or second coating alloy 38 that is of a different material or different composition of matter. The first material may be compatible with the material of substrate 20. The second material may be compatible with the first material, and also compatible with the material of second object 60. Although reference is made to first layer 36 and second layer 38, there may be more than two layers. Welding electrode applicator 30 may be as shown and described in U.S. patent application U.S. Ser. No. 15/856,146, of Huys Industries Ltd., published as US Publication 2018/0 178 308 A1 on Jun. 28, 2018, the specification and drawings thereof being incorporated in their entirety herein by reference. In each case, the welding electrode is sized to be suitable for access to and use with the surface 24 in question.

A premise of ESD coating is that the work piece is, or work pieces are, electrically conductive, and connected to one terminal of a welding power supply 80. That is, a first terminal of power supply 80 is connected by a conductor such as wire or cable 82 to welding applicator 40. In this case the work pieces are, first, substrate 20, and latterly second object 50, third object 70, and so on, however many there may be. Equally, work piece 20 may be mounted in an electrically conductive jig or fixture connected to power supply 80, as indicated notionally by connecting cable 84. Obviously, the terminal to which cable 84 is connected will, in operation, be of opposite polarity to the terminal to which cable 82 is connected. Whether directly or indirectly, substrate 20 and power supply 80 are in electrical connection to form a continuous path for electric current. Similarly, as noted, the other terminal of power supply 80 is connected to welding applicator 40 to form a continuous electrical path to welding rod 44 of opposite electrical polarity to work piece 20 such that an arc will be formed between them when they approach. During operation applicator 40 is subject to rotation or to an oscillation forcing function that causes it to vibrate, which in turn causes vibration of rod 44 against work piece 20, rapidly making and breaking contact therewith. This forcing function may be provided by a rotating mechanical imbalance, or it may be provided by an ultrasonic vibrator. In either case, the deposition process may include peening the coating with the end of the applicator rod when electricity is not being discharged, e.g., intermittently between discharges or after discharge during cooling to yield a finer grain structure and an even coating; and, additionally or alternatively, it may be shaken, as by induced vibration applied to substrate 20 either directly or through its jig to cause finer grain structure to form during cooling.

In one example, substrate 20 may be made of Inconel 718. In each example, a surface covering, or layer or treatment, includes a layer 30 that has been deposited with welding applicator 40 on surface 24 of substrate 20. Layer or coating 30 can be made of the same material as work piece 20. Alternatively it can be made of a different material having particular properties selected for suitability with the material of work piece 20. Coating 30 may be, or may include, material such as nickel that has a high affinity for other metals, and that provides an intermediary to which a further layer 34 may be applied that is of a different material that may be less compatible with the underlying material of substrate 20, but that is nonetheless compatible with the intermediate layer 32.

In some instances, coating 30 may a single layer, applied alone. However, in other instances, the process of depositing a layer of coating 30 includes a first step or portion of deposition, and a second step or portion of peening of the coating on surface 24. The peening process may tend to occur while the underlying metal is still hot, and therefore susceptible to plastic deformation. That plastic deformation due to peening tends to flatten asperities in the surface, and the resultant deformed, coated surface may tend to have a reduced tendency to develop crack initiation site.

During ESD, the tip of welding electrode rod 44 is in intermittent contact with the work surface, and that intermittent contact tends to have a mechanical hammering effect on the surface being coated. When electrical current is flowing, an arc will form and material of rod 44 will be deposited in a molten form on surface 24. There will also be local heating due to the heat of the electric current discharge. Each electrical contact results in a low energy local discharge heating of, for example, less than 10 J. Typically the discharge at one point of contact is of the order of 1 J-2 J. When the electrical discharge current is turned off, the tip of electrode rod 44 may continue repeatedly to contact the surface according to the vibration forcing function as welding applicator 40 oscillates, without further material discharge occurring. This non-electrical discharge contact, when current is not flowing, provides the peening step. The electrical discharge step may involve the switching on and off of current over relatively short time periods on the order of one or two milliseconds. This switching is achieved with programmable power supply 80. Similarly, the time period when electrical discharge current is off may be quite short, again, of the order of one or two, or a few, milliseconds. The switching "On" and "Off" may occur rapidly and repeatedly such that while the steps of discharging and peening may be distinct, and cyclic, to a human observer it may appear that they are occurring at the same time, and that they are continuous.

In some instances, the ESD discharge coating and peening process may occur in a non-participating environment. That is, the process may be performed in a vacuum chamber or it may be performed in a chamber that has been flushed with a non-participating gas, such as an inert gas such as neon or argon, or a non-oxidizing gas, such as carbon dioxide.

In some instances, the coating may be deposited, and then the process of coating may be followed by mechanical peening while electrical discharge is not occurring. In other instances it may be deposited without mechanical peening. In either case the coating process, with or without peening, may be followed by one or more steps of post-process heat treatments. Depending on the nature of the alloy from which the work piece is formed, heat treatment may be employed to promote a precipitation hardening effect. Although the composition of Inconel 718 and Hastelloy X are similar, Inconel 718 displays higher hardness and fatigue resistance. In combination with the reduced surface roughness and compressive residual stresses as a result of ESD and mechanical peening, the surface and fatigue properties of LPBF Hastelloy X parts may be improved significantly. While a separate peening tool could be used in come embodiments, it is convenient to use electrode rod 44 as the peening tool, with the electrical current interrupted.

More generally, it can be said that in its various embodiments and examples, the method of surface treatment being discussed herein may employ an electrically conductive metal alloy material. It may be applied to any metal, or metal alloy. It may be applied to weldable semi-conductor alloys. It may be applied to weldable metal-based composites such as Titanium Carbide and Titanium di-Boride. It contemplates that the work piece in various embodiments is formed of a material that includes at least one of (a) Nickel; (b) Chromium; (c) Molybdenum; (d) Titanium; (e) Tungsten; (f) Iron (g) Steel (h) Aluminum and Aluminum alloys; and (i) Niobium.; (j) Magnesium; and (k) Cobalt. The material may also include one or more of Carbon, Cobalt, Manganese, Vanadium, or other metals that may be found in steel alloys, Nickel-based alloys, Aluminum alloys or Copper alloys. In some examples, the work piece, by weight is at least one of (a) 10% Ni; (b) 5% Chromium. In some cases the work piece is made of a metal alloy of which Nickel, Chromium, and Iron and the largest constituents by wt. %. In some alloys it is more than 40% Nickel, and more than 10% Chromium, two constituents being the primary constituents of the alloy and forming a majority of the material. In some instances Nickel and Chromium form more than 70% of the alloy by weight. In other instances, the work piece is formed of a material that, by weight %, is at least one of (a) 10% Cobalt; (b) 5% Chromium. In another the work piece, by weight % is at least one of (a) 10% Titanium; (b) 2% Aluminum. In still other instances, the work piece is made of a metal alloy of which Cobalt and Chromium are the largest constituents by wt. %. In other embodiments the work piece is made of a metal alloy of which Titanium is the largest constituents by wt. %. In some instances the coating material is formed of an alloy that, by weight, has a higher percentage of Nickel than any other constituent.

In the examples, the ESD coating material of rod 44 is formed of an alloy including at least one of (a) Nickel; and (b) Chromium. In some embodiments Nickel is, by wt. %, the largest component. In some examples, the material for deposition from the welding rod as the coating is formed of an alloy that includes at least one of (a) Nickel; (b) Chromium; (c) Iron; (d) Tungsten; (e) Cobalt; and (f) Titanium. In some instances the coating material is formed of an alloy that, by weight, has a higher percentage of Nickel than any other constituent. It may be nearly pure Nickel, i.e., more than 90% by weight. In other embodiments the coating material is made of a metal alloy of which Iron is the largest constituents by wt. %. In other embodiments the coating material is made of a metal alloy of which Cobalt is the largest constituents by wt. %. In still others the coating material is made of a metal alloy of which Titanium is the largest constituents by wt. %. An Inconel 718 electrode may be used. Ultra high purity argon shielding gas can be delivered coaxially around the electrode during deposition, and ESD parameters of 100 V, 80 µF and 150 Hz can be used. The method could have an initial discharge voltage in the range of 30 to 200 V.

Figures 7A, 7B, 7D:
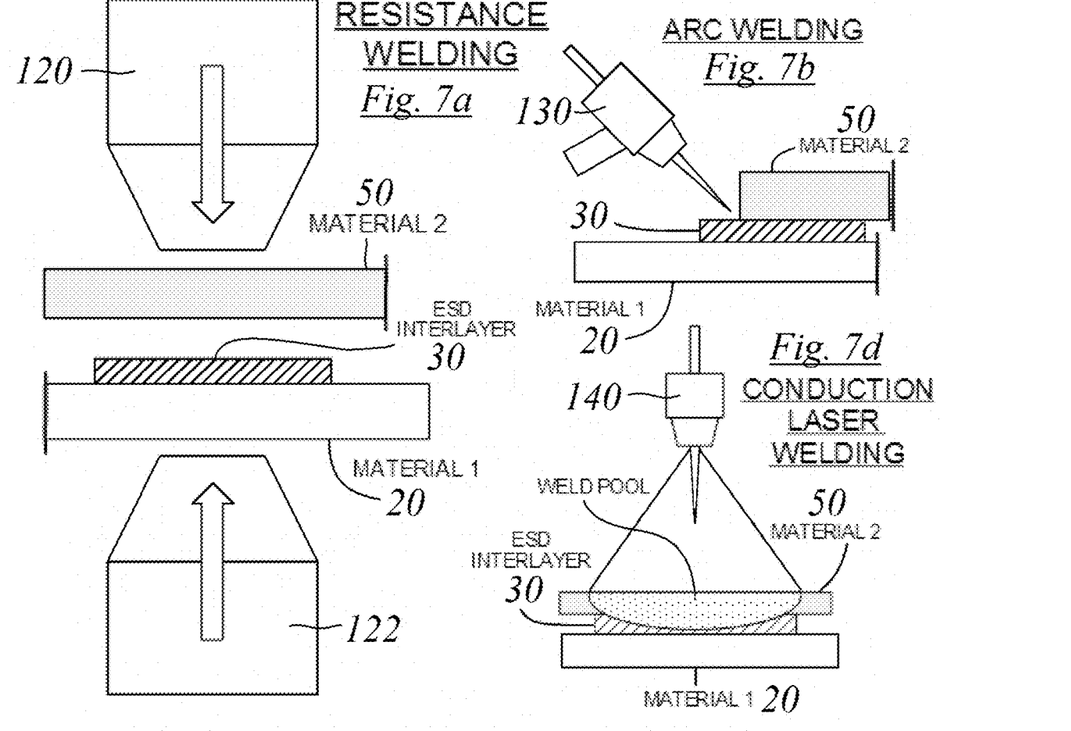
FIG. 7a is a conceptual illustration of a resistance spot welding process for welding one pre-coated sheet object to another object.
FIG. 7b is a conceptual illustration of an arc welding process for welding one coated object to another object.
FIG. 7d is a conceptual illustration of a conduction laser welding process for welding one pre-coated object to another object.
Figure 7C:
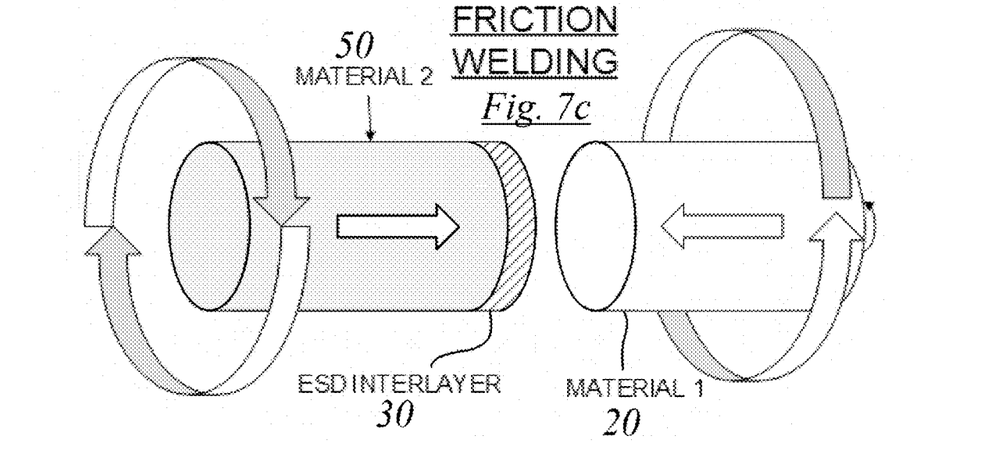
FIG. 7c is a conceptual illustration of a friction welding process for welding one pre-coated object to another object.

Once coating 30 has been applied, of however many layers or sub-layers, the second welding process occurs in securing second object 50 to coating 30. This process may occur by resistance welding as in FIG. 7a in which the first material or object 20 has been prepared with coating 30, and second object 50 is place in opposition to that coating. The first and second object are brought together and the positive and negative welding electrodes 120, 122. When contact is made current flows and the second weld is made. Alternatively, as shown in FIG. 7b, an arc welder 130 can be used to lay down a fillet between coating 30 and second object 50. In FIG. 7c the second weld is made by friction welding, as indicated. A conduction laser welder 140 could also be used in this circumstance as shown in FIG. 7d. Both processes may be undertaken with relative control over the area and size of the weld, and of the total energy input in the weld. The total energy input may be set according to the surface area of the weld to be made, and the thickness of the material of the weld. In general, the thickness of coating 30 may be intended to be thicker than, or comparable to, the depth of the second weld. Melting may occur at the interface of second object 50 (or third object 70, as may be) with coating 30, but it is not intended that so much energy should be input as to cause re-melting at the welded interface between coating 30 and substrate 20, or if such re-melting should occur, that it should be minor, and very limited in extent, and even if re-melting should occur, coating 30 may nonetheless form a barrier or obstacle to unwanted mixing or precipitation of materials. Again, the time duration of a resistance weld or of a precision laser weld is quite limited.

Figure 4C:
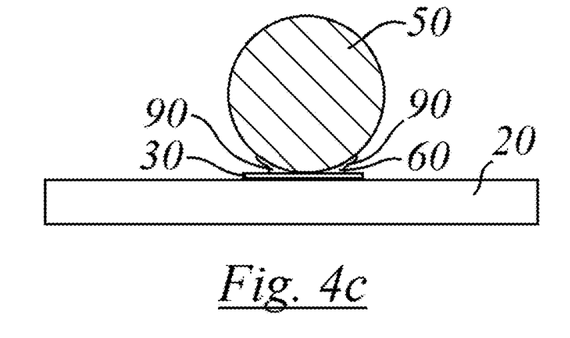
FIG. 4c is an alternate embodiment to that of FIG. 4a in which a weld filet has been built up between a first interlayer and the second object to be welded.
Figure 6:
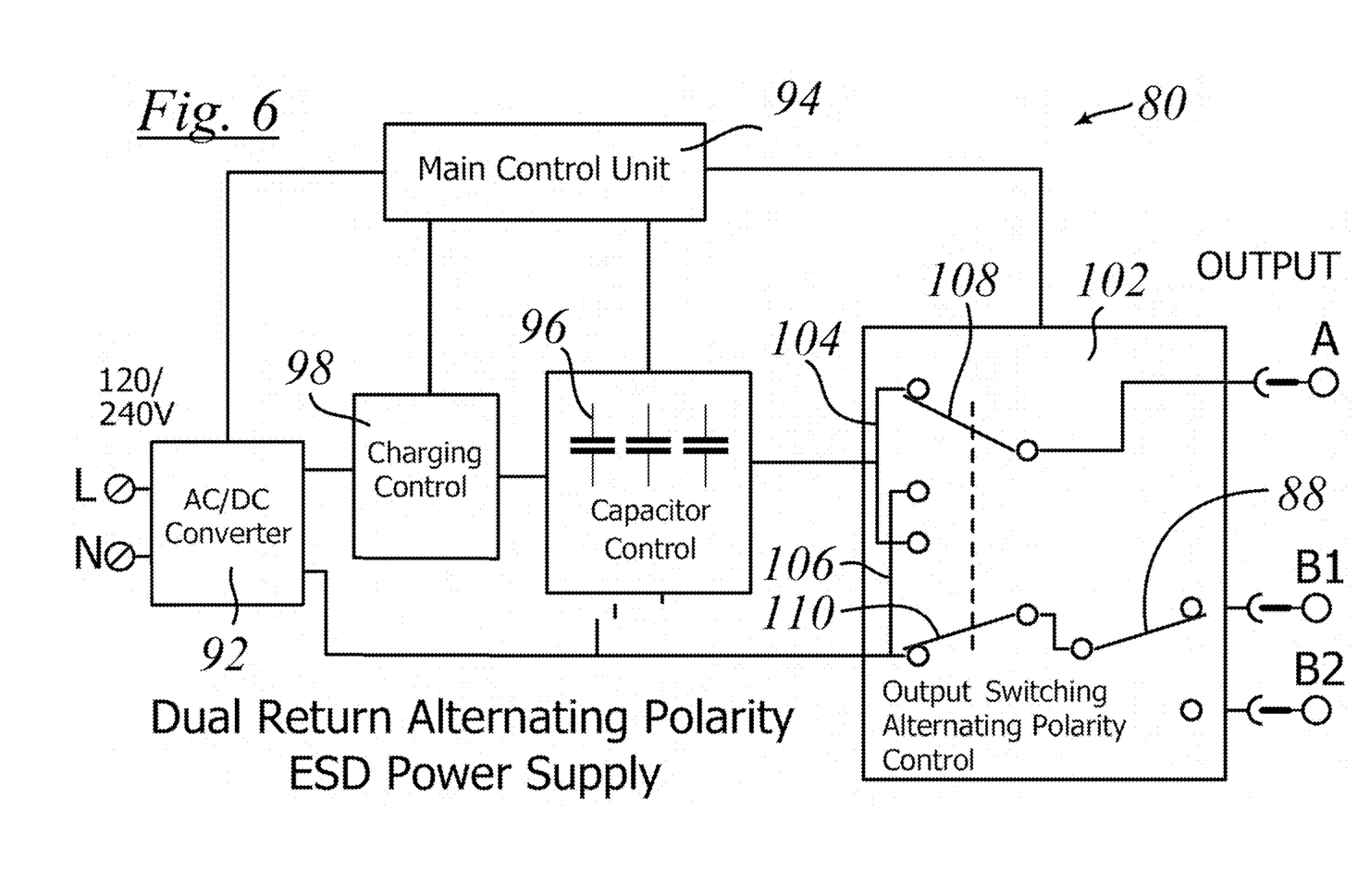
FIG. 6 shows a schematic of a polarity switching apparatus for making the filet welds of FIG. 5.

Further, as indicated in FIG. 4c, and in FIGS. 5 and 6, the second weld 90 (or welds 90, where more than one fillet is made) may in some embodiments by made using an ESD process. That is, after second object 50 is brought into contact with coating 30, ESD may be use to coat an opposed region or surface of second object 50 and to build up fillet 90 between that coated region and coating 30. To that end, power supply 80 may be a power supply as indicated in FIG. 6 that is a Dual Return Alternating Polarity ESD Power Supply. Power supply 80 has a third terminal that is connected by a wire or cable 86 to second object 50. During operation, power supply 80 has an internal switch 88 that connects either the first or second "B" terminal (i.e., B1 or B2) to permit the flow of current. The discharge will then tend to accumulate on and build either side through the arc to the point of least resistance. Over time a fillet may build as rod 44 moves long under its vibrating or rotating (or both) drive.

That is, while the use of a digitally-generated reversing DC sequence of pulses (or, alternatively, a "synthetic AC" wavetrain) may be applicable in a variety of ESD, or low energy welding, generally, FIG. 6 shows a three-pole apparatus to which reference may be made when considering the use of reversing or alternating ESD processes. In FIG. 6 power supply, P. S., 80 receives line voltage, or other source of electrical power as may be, indicated at L (line voltage) and N (neutral or ground) such as may be 120 V, 60 Hz; or 220 V, 50 Hz, and converts it to a suitable output form. That conversion may involve rectification to a DC signal, and accumulation of charge on capacitor banks. Power supply 80 has three output terminals T1, T2 and T3, respectively. T1 is connected to the welding handle or applicator 40, and ultimately to the welding electrode 44, identified notionally as handle-and-electrode-assembly applicator 40 by a conductor such as indicated as cable 82. T2 is electrically connected to substrate 20 and T3 is electrically connected to second object 50, as indicated by cables 84, 86 respectively.

ESD, or low energy welding, may be commenced by applying a voltage discharge across T1 and either of T2 or T3. The welding rod and handle assembly of applicator 40 may be very finely guided along the site at which a weld filet is desired between first object 20 and second object 50 by an automated welding electrode holder, carriage, or robot, symbolized by item 40. Alternatively, the handle may be held and moved manually.

Where the parts are of dissimilar materials, welding may start by coating the exposed surface of one or both of first object 20 and second object 50 with an intermediate composition, such as nickel, or a nickel-rich alloy, to build up a stratum to which other materials may be welded more easily. Whether for similar metals or for dissimilar metals, ESD, or low energy welding, may be used to build up a coated layer, i.e., interlayer coating 30, of however many layers 36, 38, etc. It may then be used to build up a fillet, or fillets 90 of weld metal between the parent metal of the two parts. This may take several passes, or coating sessions, as may be. The process may occur under an inert atmosphere, or in the presence of a supplied flow of shielding gas using suitable apparatus as described above. It may occur using a hand-held apparatus or a robot mounted welding electrode. When completed, the resultant weld may have only a small heat affected zone, or no appreciable heat affected zone. The weld may be very close to near net size, and may not require grinding or other surface finishing.

During operation, power supply 80 provides the welding electrode with current. As seen in the schematic drawing of FIG. 6, power supply 80 may be a polarity switching electro-spark discharge power supply. It has an input interface in the form of an input power converter 92 which converts line voltage to voltage usable within the power supply. The input power may be alternating current, e.g., 120 V, 60 Hz or 240 V, 50 Hz; or it may be a DC supply voltage, such as 150 V from another power supply to which power supply 80 may be connected as a power interface box, or converter. Input power converter 92 may be a two-terminal input having a first input L, for line voltage, and a second terminal N for neutral or ground. Power supply 80 also has a main control unit 94. Main control unit 94 may also be termed, or may include, a central processing unit which may have the form of a circuit board and ancillary components. Main control unit 94 is programmed to determine the nature of the input power signal received at converter 92, and to convert it accordingly into rectified DC at an appropriate voltage for charging the capacitors of the capacitor bank (or banks) 96. Capacitor banks 96 may include a single set of capacitors, two sets of capacitors, or more sets of capacitors. Main control unit 94 is also controls the charging of the capacitors of capacitor banks 96, and monitors their stored voltage levels, setting those voltage levels according to the voltage required for the programmed output pulses. This may be done by controlling the positive voltage output from input power converter 92 using a charging control 98 connected in series between input power converter 92 and capacitor banks 96. Main control unit 94 also controls discharge switching connected between the positive side of capacitor banks 96 and the input positive terminal of a polarity switching control unit 102.

Polarity switching control 102 has two internal pairs of terminals 104, 106, the first being positive, the other being negative, neutral, or ground. Polarity switching control 102 also has two internal throws, or switches, 108, 110 that are slaved, i.e., linked, together. Control unit 94 operates switches 108, 110, connecting them alternately to the first, second and third discharge power outlet terminals, seen as "A", "B1" and "B2". In the normal, or straight polarity context, terminal pair 104 is connected through switch 108 to terminal "A". Similarly, the other side of terminal pair 106 is connected through switch 110 to one or the other of terminal "B1" and terminal "B2". In this configuration a "positive" charge pulse will be sent to welding electrode applicator 40. Alternatively, in the opposite position, main control unit 94 sets the switches such that the positive side, of terminal pair 104, is connected through switch 110 to one or the other of terminal "B1" and terminal "B2", and the negative, neutral, or ground side, of terminal pair 108, is connected through to terminal "A", thus reversing the discharge polarity. That is, main control unit 94 operates to control the switching of alternating polarity switches 108 and 110, and to control the switching of alternate output control switch 88 which moves between alternate outputs "B1" and "B2".

In operation, the output switching of FIG. 6 is controlled by main control unit 94. Although the synthetic DC electrical signals, or electrical pulses, however they may be called, may not have the same period or pulse duration, they may have an average rate of discharge, or an accumulated number of signals per elapsed unit of time. For example, there may be 10 to 10,000 signals, or discharges, over a period of 1 second. In some embodiments this rate may be in the range of 1500 discharges per second to 5000 discharges per second. This can be termed a frequency range of 10 Hz to 10 kHz, except that the individual pulses are not cyclic, but rather are discrete, programmed, DC discharges. The operator may program the power supply by adjusting the discharge voltage levels, and the overall energy discharge per unit time (effectively, the pulse voltage, total charge, and the number of pulses per second) to govern the overall heat input into the workpiece interface (e.g., to avoid overheating). However, once having set those external input parameters, the main control unit is programmed electronically to implement the selections made by the operator.

The operator may also select whether straight polarity is to be employed, and to what extent. Alternatively, the deposition apparatus may sense the rate of consumption of the welding electrode, and, when that rate of consumption has fallen relative to the initial rate by a datum amount, such as $1/5$ or $1/4$ (i.e., to $4/5$ or $3/4$ of the original rate), to initiate a cleaning cycle using straight polarity. The cleaning cycle may include a series, or burst, of straight polarity pulses, or it may be implemented by alternating between forward or straight (i.e., cleaning) and reverse (i.e., deposition) pulses. The number of straight pulses may be different from, (i.e., not equal to), the number of reverse pulses. For example, the ratio of cleaning pulses to deposition pulses may be in the range of 1:1 to 1:10.

ESD operates by discharging a capacitor through a welding rod and work piece sheet, creating a short-duration arc that transfers droplets of material from the welding rod onto the work piece. With repeated capacitor discharge, the small droplets are layered to form thicker coatings. Due to the small droplet size and short pulse durations, heat input and heat buildup is limited, typically to 1 or 2 Joules per discharge, or less; and generally less than 10 Joules. ESD AA4043 interlayers are shown to result in stronger resistance spot welds than the use of other interlayer deposition techniques.

In respect of materials and methods, in the example commercially available welding rods of may be of relatively small diameter, such as 1.8 mm diameter. The ESD process parameters may be chosen to obtain the fastest deposition rate, e.g., of 310 g and 140 V at 150 Hz frequency. Shielding gas may be used, such as ultra high purity argon gas applied coaxially with the welding rod at a flow rate of 10 L/min. Relatively high rates of deposition can be obtained with discharges in the range of 200-400 µF. The range of voltages observed to yield suitable rates of deposition was 100-160 V.

In other embodiments, the second welding step could be a step of laser welding or of friction welding, or a plasma arc weld, the point being that the second weld is made between the second object and the already-deposited interlayer.

To summarize, as disclosed there is a method of forming a welded connection between a first object 20 and a second object 50. First object 20 and second object 50 are electrically conductive. The method includes coating a first region of first object 20 with an electro-spark discharge coating 30, which may be referred to as an interlayer. The second object is placed in contact with coating 30 of first object 20. The method includes subsequently welding second object 50 to ESD coating 30 of first object 20.

In a feature, second object 50 is welded to ESD coating 30 by a method of welding other than ESD. In the alternative, second object 50 is welded to ESD coating 30 by ESD welding. In another feature, the first region of coating 30 of first object 20 has a footprint that corresponds to a footprint of second object 50. In another feature, first object 20 is made of a different material from second object 50. In another feature, ESD coating 30 is made of the same material as said second object 50. In another feature, first object 20 is made of a first material; second object 50 is made of a second material; ESD coating 30 is made of a material that is different from the first material; and ESD coating 30 is made of a material that is different from the second material. In another feature, the second material is different from the first material. In a still further feature, the second material is a shape memory alloy. In a further feature, the shape memory alloy is a NiTi alloy. In another feature, first object 20 is a stainless steel alloy. In another feature, the subsequent welding is laser welding. In an alternate feature, the subsequent welding is resistance welding. In still another alternate, it may be friction welding. In a further alternate it may be plasma arc welding.

The method can include coating a second region of second object 50 with an ESD coating layer, and the subsequent welding includes welding the first ESD coating layer to the second ESD coating layer. The method can include coating of first object 20 with more than one pass of ESD material to build a coated region of a set thickness. The method can include depositing a first layer and a second layer of ESD material on first object 20, and the first layer is made of a different composition of material than at least one subsequent layer. In another feature, the method includes alternately discharging electrical current through first object 20 and second object 50 to build a weld fillet of ESD material between first object 20 and said second object 50. In another feature, the method includes forming at least a second electro-spark discharge coated region on the first object and welding the second object to the first object at least at the first ESD coated region and at the second ESD coated region. Further the method can include forming at least a second ESD coated region on first object 20, and subsequently welding a third object 70 to the second ESD coated region.

In another aspect, there is a welded assembly. It has a first object; a second object; and an electro-spark discharge interlayer. The electro-spark interlayer is formed on the first object; and there is a second weld between the ESD layer and the second object. In another feature, there is a heat affected zone in the second object adjacent to the weld between the ESD layer and the second object. In a further feature, the second object is welded to the electro-spark discharge coated region by electro-spark discharge welding and said weld is free of a heat affected zone. In another feature the first region of the coating has a footprint that corresponds to a footprint of the second object. In another feature, the first object is made of a different material from the second object. In another feature, the electro-spark discharge coating is made of the same material as said second object. In another feature, the second material is a shape memory alloy. In another feature, the shape memory alloy is a NiTi alloy. In another feature, the first object is a stainless steel alloy.

Various combinations have been shown, or described, or both. The features of the various embodiments may be mixed and matched as may be appropriate without the need for further description of all possible variations, combinations, and permutations of those features. The principles of the present invention are not limited to these specific examples that are given by way of illustration. It is possible to make other embodiments that employ the principles of the invention and that fall within its spirit and scope of the invention. Since changes in and or additions to the above-described embodiments may be made without departing from the nature, spirit or scope of the invention, the invention is not to be limited to those details, but only by the appended claims.

The invention claimed is:

1. A method of forming a welded connection between a first object and a second object, the first object and the second object being electrically conductive, wherein said method comprises:
   coating a first region of the first object with an electro-spark discharge coating;
   placing the second object in contact with the coated region of the first object;
   subsequently welding the second object to the electro-spark discharged coating of the first region of the first object; and
   said welding of said second object to said electro-spark discharge coated first region of said first object is by electro-spark discharge welding.

2. The method of claim 1 wherein said first region has a footprint that corresponds to a footprint of said second object.

3. The method of claim 1 wherein said first object is made of a different material from said second object.

4. The method of claim 1 wherein said electro-spark discharge coating is made of the same material as said second object.

5. The method of claim 1 wherein:
said first object is made of a first material;
said second object is made of a second material;
said electro-spark discharge coating is made of a material that is different from said first material; and
said electro-spark discharge coating is made of a material that is different from said second material.

6. The method of claim 5 wherein said second material differs from said first material.

7. The method of claim 1 wherein one of (a) said second object is made of a material that is a shape memory alloy and said shape memory alloy is a Nickel-Titanium (NiTi) alloy; and (b) said first object is a stainless steel alloy.

8. The method of claim 7 wherein said first object is made of a steel alloy.

9. The method of claim 1 wherein said electro-spark coating of said first region of said first object defines an interlayer and said interlayer is made of an aluminum alloy.

10. The method of claim 1 wherein said electro-spark coating of said first region of said first object defines an interlayer and said interlayer is made of an interlayer alloy having a largest component by wt %; said second object is made of an alloy having a largest component by wt %, and said largest component of said interlayer is the same as said largest component of said second object.

11. The method of claim 1 wherein said electro-spark coating of said first region of said first object defines an interlayer and said second object has a lower melting point than said first object.

12. The method of claim 1 wherein said electro-spark coating of said first region of said first object defines an interlayer and said interlayer has a lower melting point than said first object.

13. The method of claim 1 wherein the subsequent welding is one of (a) laser welding; (b) resistance welding; (c) friction welding; and (d) plasma arc welding.

14. The method of claim 1 wherein said electro-spark discharge coating of said first region of said first object defines a first electro-spark discharge layer and said method includes coating a second region of said second object with an electro-spark discharge coating to define a second electro-spark discharge layer, and said subsequent welding includes welding said first electro-spark discharge layer to said second electro-spark discharge layer.

15. The method of claim 1 wherein said method includes the coating of said first object includes making more than one pass of electro-spark discharge deposited material on said first object to build a coated region of a set thickness.

16. The method of claim 1 wherein said method includes making at least a first layer and a second layer of electro-spark discharge deposited material on said first object, wherein said first layer is made of a different composition of material than at least one subsequent layer.

17. The method of claim 1 wherein said method includes alternately discharging electrical current through said first object and said second object to build a weld fillet of electro-spark discharge material between said first object and said second object.

18. The method of claim 1 wherein said method includes forming at least a second electro-spark discharge coated region on said first object, said first and second electro-spark discharge coated regions being separate, and welding said second object to said first object at least at said first electro-spark discharge coated region and at said second electro-spark discharge coated region.

19. The method of claim 1 wherein said method includes forming at least a second electro-spark discharge coated region on said first object, said first and second electro-spark discharge coated regions being separate, and subsequently welding a third object to said second electro-spark discharge coated region.

20. The method of claim 1 wherein said method includes at least one of (a) vibrating; and (b) rotating the electro-spark discharge electrode.

\* \* \* \* \*